March 6, 1945. H. DAVIS 2,370,845
MEASUREMENT OF STRESS
Filed Feb. 18, 1942 3 Sheets-Sheet 1
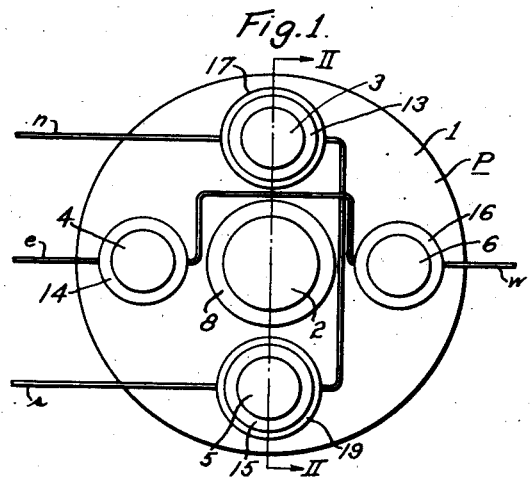
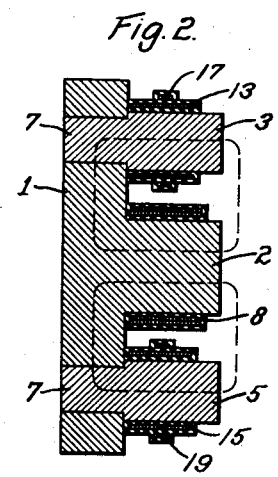
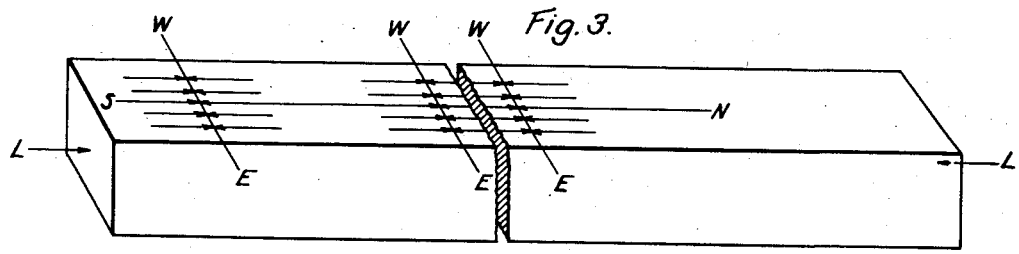
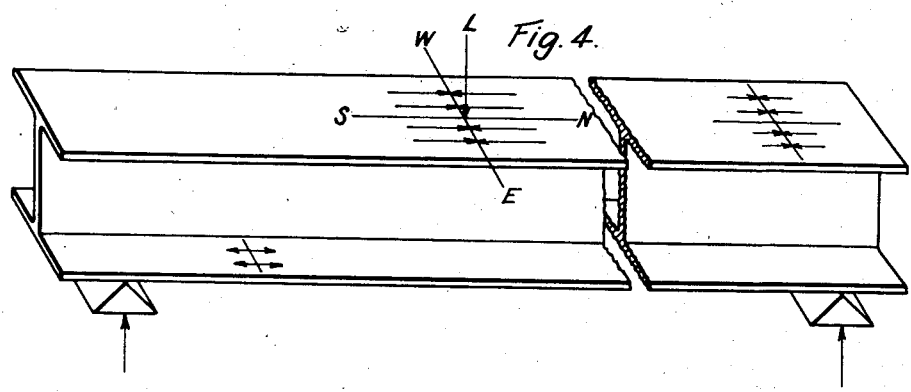
INVENTOR
*Hunt Davis.*
BY
*Bernard L. Zangwill*
ATTORNEY March 6, 1945.   H. DAVIS   2,370,845
MEASUREMENT OF STRESS
Filed Feb. 18, 1942   3 Sheets-Sheet 2

INVENTOR
Hunt Davis.
BY
Bernard L. Zangwill
ATTORNEY

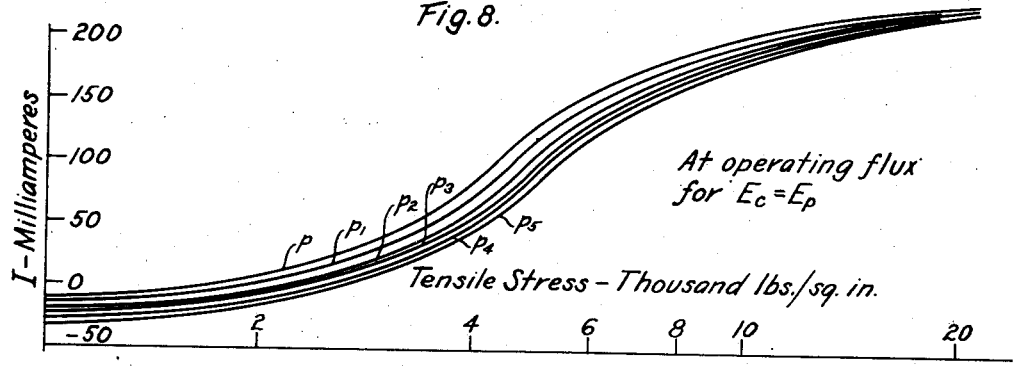
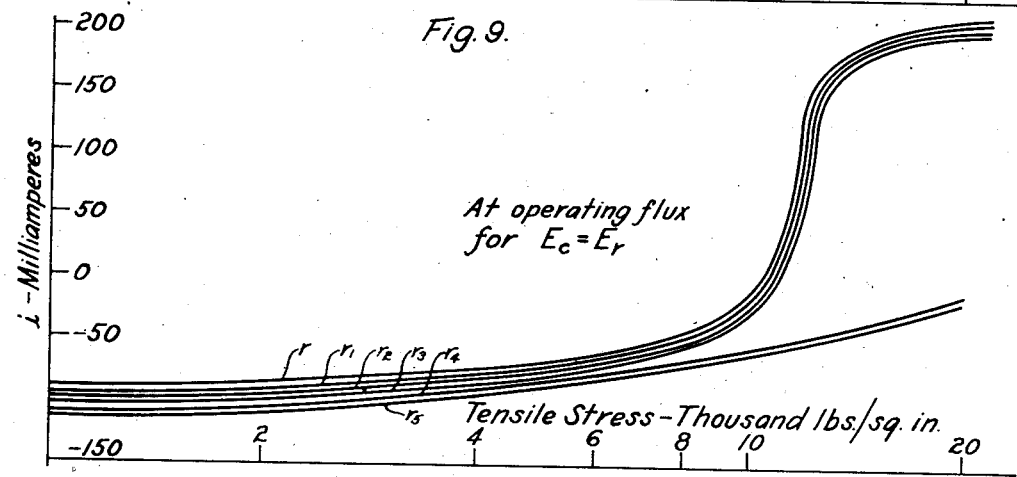
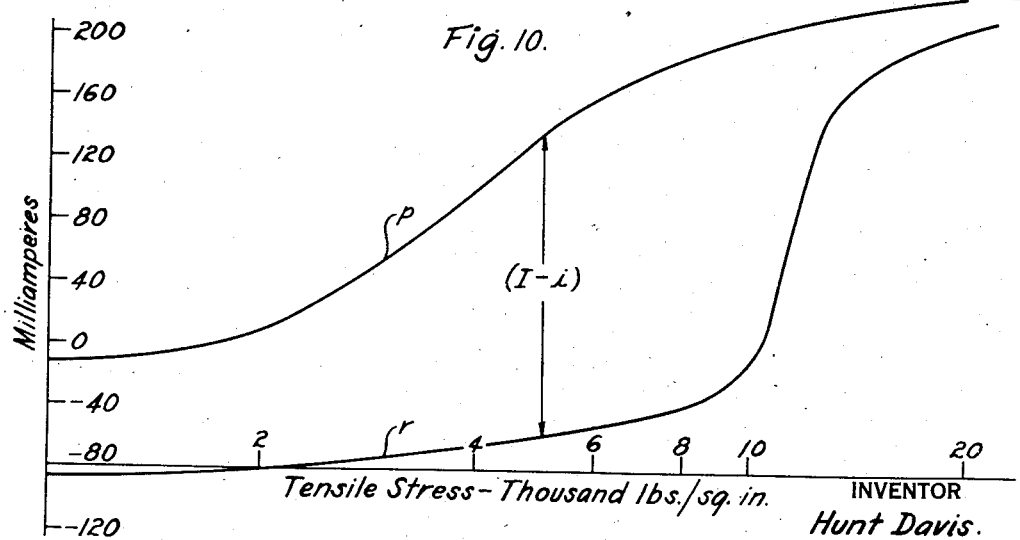

Patented Mar. 6, 1945

2,370,845

UNITED STATES PATENT OFFICE 2,370,845

MEASUREMENT OF STRESS

Hunt Davis, Greensburg, Pa.

Application February 18, 1942, Serial No. 431,342

24 Claims. (Cl. 175—183)

My invention relates to ways and means for determining the mechanical stress in loaded members which have such magnetic properties that their permeabilities vary under different loadings.

It is an object of my invention to provide new means and methods for determining the stress in stressed magnetic materials, especially ferrous structural members.

Present methods for measuring stresses in stressed members depend fundamentally on the measurement of changes in a physical dimension of the member or in deflection of the member, the measuring usually being done by a strain gauge or the equivalent. The change in stress causing such dimensional change or deflection can then be determined, but such determinations yield only the increment of stress which produced the dimensional or deflective change. Unless the member is initially unstressed or the initial stress known, the actual stress in the member cannot be ascertained. My invention provides a means and method by which the actual stress in a stressed member having an otherwise unknown final or initial loading, can be readily determined.

It is a more particular object of my invention to provide means and methods for easily determining the actual stress in structural-steel members, for example, girders, beams, columns and the like, which are parts of erected structures, and are stressed by an unknown dead load or an unknown combination of a dead and live load.

It is an object of my invention to provide a method for magnetically determining unknown stresses in a member of a type described, which method is independent of factors variably affecting the magnetic properties of the member, or the measurement of the magnetic properties.

My invention makes use of the fact that for a given flux density the magnetic permeability of a steel member varies with different stresses in the member. By comparing, preferably differentially, the permeability of a portion of the member at which the stress is unknown, with the permeability of a portion of the member which is under a known stress, preferably unstressed, such unknown stress in the member can, by means of my invention, be measurably determined; thus divorcing the stress measurements from the strain or deflection methods of the prior art.

Other objects, features, methods and innovations of my invention, in addition to those mentioned above, will be apparent from the following description thereof, which is to be taken in connection with the accompanying drawings. In these drawings:

Fig. 1 is a front view of a form of an instrument used in the practice of my invention, with some electrical connections omitted for clarity;

Fig. 2 is a central sectional view of the instrument on the line II—II of Fig. 1;

Figs. 3 and 4 are diagrammatic views of stressed members, for indicating the application and operation of my invention;

Figs. 7, 8, 9 and 10 are illustrative graphs by means of which I explain the principles and operation of my invention.

In the practice and application of my invention I make use of the fact that stressed beams, bars, columns, girders, and other members to which my invention can be applied, usually are substantially or actually unstressed in one direction, particularly at an exterior surface of the member. The magnetic properties in this direction, therefore, may be used as a reference for the magnetic properties of the member in an unstressed condition. The magnetic properties of the stressed member in a location along a stressed direction is compared to the similar properties in the unstressed direction in a manner which is not materially affected by other anisotropic effects, and from such comparison the stress of the member in the location selected can be ascertained.

Figs. 3 and 4 represent structural steel members as examples, and not as limitations, of members having stresses therein which can be determined by my invention. Fig. 3 shows forces L compressing a bar along the indicated longitudinal or N-S axis of the beam, parallel to the direction of the forces L; the compressive stress lines being shown as arrows distributed across the indicated transverse E-W axis, parallel to which there is comparatively no compressive stress. Fig. 4 shows an I-beam supported at its ends and subjected to a concentrated load L acting on the top flange of the I-beam between the supports. This top flange will be in compression along the indicated N-S axis lengthwise of the beam, and will be substantially unstressed along the transverse E-W axis. Consequently, each such specimen or member has a stressed direction and an unstressed direction; the N-S direction being, in the examples shown, the direction of maximum stress.

While I have illustrated and described the stress conditions at the exterior surfaces of the bar of Fig. 3 and the beam of Fig. 4, as compressive; the illustrations are also applicable to tensile stresses, such as would occur if the forces L of Fig. 3 were outwardly directed, or as occurs on the lower flange of the beam of Fig. 4. In every case, there is an equivalent of an E-W axis, parallel to which there are neither compressive nor tensile stresses.

Figure 7:
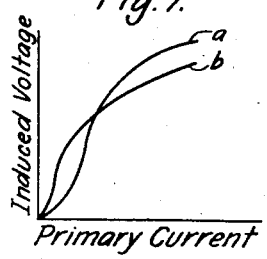

Stress affects the permeability of a ferro-magnetic material, an effect which is well known. Fig. 7 indicates this phenomenon, curve $a$ being a form of a magnetization curve for an unstressed member, and curve $b$ being the curve for the same member under a tensile stress of, say, 2000 pounds per square inch. The abscissas represent the alternating current in a primary winding about the member, which is a measure of magnetomotive force, and the ordinates represent the voltages induced in a closely-coupled secondary, which voltage is a direct measure of the flux in the member. Since stress affects permeability, it should be possible to determine the stress of a stressed member if the other factors which variably affect permeability or magnetic reluctance could be counterbalanced or nullified. Through my invention, I propose to so measure stress.

In carrying out my invention, I provide an instrument, in the form of a differential permeameter, which, in the specific form herein described, preferably has a central field-establishing or exciting coil about which four identical secondary or pick-up coils are symmetrically arranged, with the plane joining the axes of two of the coils, which compose one set, or pair of pick-up coils, passing through the axis of the central exciting coil where it intersects at right angles the plane joining the axes of the other set or pair of pick-up coils. Stress or stresses in a member can be ascertained by properly placing the instrument against the member, connecting the various coils in manners to be later described, measuring certain electrical quantities in the connections, and applying the measured quantities, in a certain manner, to a calibration curve for the instrument.

Such as instrument P, is shown in Figs. 1 and 2. It comprises a magnetic structure having a round body-plate 1 of uniform thickness, formed with an integral central cylindrical pole piece 2. Four pole pieces 3, 4, 5 and 6, which are alike, are symmetrically positioned and spaced about the central pole piece 2, at what can be designated as cardinal points with respect thereto, the pole 3 comprising a north pole, the pole 4 an east pole, the pole 5 a south pole and the pole 6 a west pole. For economical manufacture each pole piece 3, 4, 5 and 6 is provided with a shank 7 which is tightly fitted into a mating hole in the body-plate 1, the adjacent shoulders of the pole pieces firmly seating thereon. The free ends of all five of the pole pieces lie in a plane for providing contact faces which can be placed against a flat surface of a member under exploration.

A primary or exciting coil or winding 8, connectible to an alternating-current source of energy, is closely placed about pole piece 2; and secondary or pick-up coils or windings 13, 14, 15 and 16 are closely placed respectively about the pole pieces 3, 4, 5 and 6. Windings 13, 14, 15 and 16 are identical in this instrument. When current is passed through exciting coil 8, a common magnetomotive force is established causing magnetic flux in the pole piece 2, which divides into four flux portions in parallel, because of the four branch magnetic paths provided, in part, by the pick-up pole pieces 3, 4, 5 and 6. A flux portion passes through each pick-up pole piece. The paths of two of these flux portions are illustrated diagrammatically in Fig. 2.

The flux portion in each pick-up pole piece, 3, 4, 5 and 6, induces a voltage in the pick-up coils 13, 14, 15 and 16, respectively. The pick-up coils 13 and 15 are connected and poled so that the alternating voltages induced therein are added in phase, producing a resultant combined voltage $V_{ns}$ which manifests itself across output conductors $n$ and $s$ for the coils 13 and 15; and the pick-up coils 14 and 16 are likewise connected and poled so that the resultant additive voltage $V_{ew}$ of the voltages induced in the coils 14 and 16 manifests itself across output conductors $e$ and $w$ for the coils 14 and 16. Additional magnetomotive force means are provided comprising two sub-excitation windings or coils 17 and 19, the former about pole piece 3 and the latter about the pole piece 5, closely coupled about pick-up coils 13 and 15, respectively. These sub-excitation coils 17 and 19 which are identical, are series connected and so poled that, when properly energized from the source of alternating current, they will produce sub-excitation magnetomotive forces in pole pieces 3 and 5, which will either both oppose the exciting magnetomotive force of the coil 8 and the current therein, or will both aid this exciting magnetomotive force. Consequently each coil 17 and 19 affects the flux portion through each of the associated pole pieces 3 and 5, respectively, in the same manner. When the total sub-excitation magnetomotive force acts in the same sense as the exciting magnetomotive force, that is, increases the flux through the associated pole pieces 3 and 5; the sub-excitation current is considered positive. Similarly, when this sub-excitation magnetomotive force acts in the opposite sense from the exciting magnetomotive force of coil 8, that is, decreases the flux through the associated pole pieces 3 and 5; the sub-excitation current is considered negative.

The magnetomotive forces of the sub-excitation coils 17 and 19 neutralize each other with respect to the magnetic path which is common to both of them in its entirety.

Figure 5:
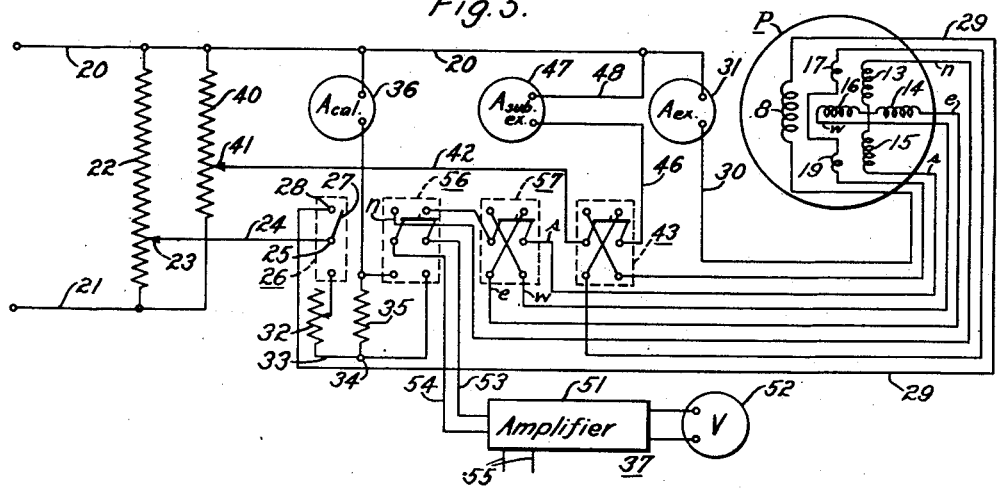
Fig. 5 is a preferred wiring diagram of electrical connections for the instrument of Figs. 1 and 2, which are utilized in the determination of the stress in a stressed member.

A set of connections usable in the practical use of the instrument P is shown in Fig. 5, these connections being hereinafter described with reference thereto. Energizing leads 20 and 21 are connectible to any suitable source of alternating-current, ordinary commercial 60-cycle power, reduced to proper operating voltage if desired, being suitable. A potentiometer 22, across the leads 20 and 21, has an adjustable tap 23 connected to a conductor 24 connected to a center terminal 25 of a single pole double throw switch 26 having a switch blade 27. With the blade 27 in the upper position, the exciting coil 8 is energized through a circuit including upper terminal 28 of switch 26, a conductor 29, the coil 8, a conductor 30, and an exciting-circuit-ammeter 31 having one terminal connected to the lead 20. With the blade 27 in lower position, a calibrating circuit is completed to the lead 20 through a variable resistor 32, a conductor 33, junction 34, a calibrating fixed standard resistor 35, and a calibrating ammeter 36; this calibrating circuit being used to calibrate a vacuum-tube voltmeter 37.

The series connected sub-excitation coils 17 and 19 are variably energized through a potentiometer 40 connected across the leads 20 and 21. The potentiometer 40 has an adjustable tap 41 connected to a conductor 42 which is connected to a center terminal of a double pole reversing switch 43, the other center terminal of which is connected to a conductor 46. The end terminals of the switch 43 are cross connected to the sub-excitation coils 17 and 19 which are in series. The sub-excitation circuit is ultimately completed from the conductor 46 through a sub-excitation circuit-ammeter 47 and a conductor 48 to the lead 20. When the switch 43 is closed in one position, e. g., the up position, the coils 17 and 19 are so poled and connected that they can produce a sub-excitation magnetomotive force acting on pole pieces 3 and 5, which aids the action thereon of the main exciting magnetomotive force produced by coil 8; and when the switch 43 is closed in its other, or down, position, such sub-excitation magnetomotive force is made to oppose the main exciting magnetomotive force thereof. In the former instance the sub-excitation current through the coils 17 and 19 is considered additive or positive with respect to the exciting current through the coil 8, and in the latter instance it is considered subtractive or negative with respect to this exciting current.

In the application of the instrument for ascertaining stress, the voltages $V_{ns}$ and $V_{ew}$ are combined in two different manners and the resultant voltage in each case is measured by any suitable voltmeter, shown in Fig. 5 as being comprised by the vacuum-tube voltmeter 37 having an amplifier 51 and indicator 52. The combined voltage is applied to the voltmeter through conductors 53 and 54; and power for amplification is obtained from power leads 55.

Two double-throw double-pole switches 56 and 57, the latter being a reversing switch, permit the voltages $V_{ns}$ and $V_{ew}$ to be combined additively or subtractively. The switch 56 in the up position causes the combined voltage to be applied to the voltmeter 37. With the coils 13, 14, 15 and 16 properly poled, the up positions of the switches 56 and 57 cause the voltages to be combined additively, that is, $V_{ns}$ and $V_{ew}$ are in phase, as will be understood by those skilled in the electrical art. By throwing the reversing switch 57 to down position the voltages are combined subtractively, that is $V_{ns}$ and $V_{ew}$ are 180° out of phase.

By throwing the switch 56 to the down position, the voltage drop across the standard resistor 35 is represented by a reading on the voltmeter indicator 52.

In general, the instrument P is utilized for determining stress in a member by placing the free ends of the pole pieces against a relatively flat surface of the member, the poles 3 and 5 along the stressed direction, which is assumed to be the longitudinal direction, and the poles 4 and 6 transverse thereto. With reference to Figs. 3 and 4 it may be assumed that the pick-up poles 3, 4, 5 and 6 are respectively along the N-, E-, S-, and W- axes, or along axes respectively parallel to these, and the exciting pole 2 at the intersection or origin.

The instrument is operated with two different selected operating, total magnetic fluxes successively established in the pick-up pole pieces. Whenever an exciting alternating current passes through the exciting coil 8, a common magnetomotive force is established, which produces a total operating flux consisting of flux portions passing through each of the four parallel magnetic paths comprising, respectively, the pole pieces 3, 4, 5 and 6. The flux portions parallel to the NS direction are generally not equal to the flux portions parallel to the EW direction. For any such total operating flux $f$, the difference between $V_{ns}$ and $V_{ew}$ is due to the difference in distribution of the flux between the NS direction and the EW direction; which, when there is no sub-excitation current, is due to the difference in reluctances of the magnetic paths which are along a stressed direction and an unstressed direction, respectively, in the member.

Figure 6:
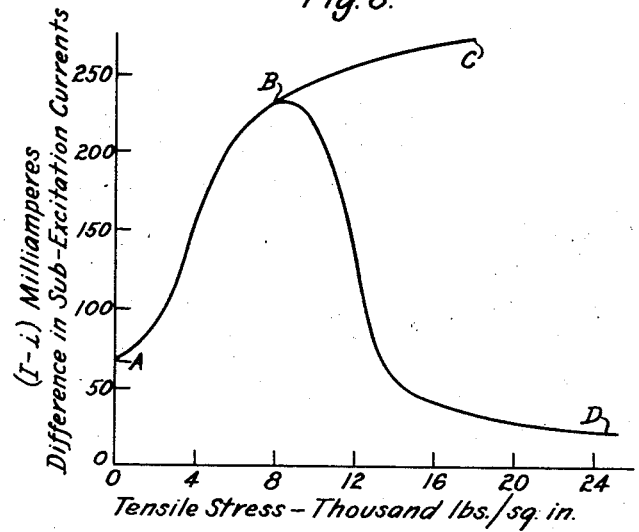
Fig. 6 is an illustrative graphic curve by means of which stress in a stressed member can be determined from suitable manipulations and readings in the electrical connections of Fig. 5.

The difference between $V_{ns}$ and $V_{ew}$ may be made substantially zero by passing an adjustable sub-excitation current $i$ through the coils 17 and 19, which, in effect, may be considered as causing an adjustable additional flux (positive or negative with respect to the main flux produced by coil 8) to pass through the poles 3 and 5. For the operating flux $f$, the sub-excitation current required to make $(V_{ns} - V_{ew})$ equal to zero is a direct measure of the difference in reluctance, at the location of the instrument, between the external portions of the magnetic path, extending substantially between the ends of pole pieces 3 and 5, and the portion similarly extending between the ends of the pole pieces 4 and 6. The sub-excitation current $i$ required to make $V_{ns}$ equal $V_{ew}$ is compared to another sub-excitation current $I$ required to produce the same results with a different magnetomotive force on the pole piece 2, producing a different total operating flux $F$. The difference between $I$ and $i$ is used to ascertain the stress in the member at the location of the instrument, from a calibration curve which accompanies the instrument P, such a curve having been obtained from applying the instrument to a specimen subjected to known stresses. A graphic-curve of this kind is shown in Fig. 6. Operating fluxes $f$ and $F$ are caused to pass through the instrument in obtaining the calibration curve, so that it is necessary to duplicate these operating fluxes when testing unknown members. This is done by observing, when obtaining this calibration curve, the total induced voltage output of the pick-up coils connected additively in series, which accompanies an operating flux and is a measure thereof; and duplicating this operating voltage when testing a member for stress therein.

Use of instrument

With the instrument on the ferro-magnetic member to be tested, all switches of Fig. 5 are open except switches 27 and 56 which are closed in down position. The calibrating circuit, including the calibrating standard resistor 35 and calibrating ammeter 36, is closed, causing an ascertainable voltage drop across the resistor, which is applied through the switch 56 to the vacuum-tube voltmeter 37. The potentiometer tap 23 and the variable resistor 32 can be adjusted until the voltage drop across the standard resistor 35, as determined by the product of the known resistance of the standard resistor and the current indication in the ammeter 36, has a value which is the desired operating voltage $E_f$ accompanying the desired operating flux $f$. This operating voltage drop produces a certain indication representative thereof, on the indicator 52.

The blades of switches 26, 56, 57 are then placed in up positions, completing the exciting circuit to the exciting coil 8, and completing a pick-up circuit in which the pick-up coil voltages $V_{ns}$ and $V_{ew}$ are additively combined, producing a combined voltage $E_c$ equal to $V_{ns} + V_{ew}$. This additive combined voltage $E_c$ is applied to the voltmeter 37. By adjusting the tap 23 of potentiometer 22, the exciting current in the coil 8 can be varied until the indicator 37 indicates a value representing an additive combined voltage $E_o$ which is equal to the operating voltage $E_r$ for the desired operating flux $f$. Switch 57 is then closed in lower position, thereby connecting $V_{ns}$ and $V_{ew}$ subtractively.

Upon closing switch 48, the sub-excitation circuit is completed through the tap 41, switch 48, coils 17 and 18 and ammeter 47. The switch 48 is manipulated and the tap 41 is adjusted until a minimum differential combined voltage $E_d$, equal to $V_{ns}-V_{ew}$, is indicated by voltmeter 37. The sub-excitation current $i$ is then noted. It has been previously determined, for the embodiment shown, that sub-excitation current $i$ flowing through the circuit with switch 48 in the up position, produces a magnetomotive force which acts in the same direction on the pole pieces 3 and 5, in relation to the magnetomotive force of coil 8, and is therefore positive. Similarly, when switch 48 is in the down position, $i$ is negative.

The application or adjustment of the sub-excitation current may affect the additive combined pick-up voltage $E_o$, which, after the initial measurement, is determined while current flows in both the exciting and sub-excitation coils. Therefore, without moving the other switches, switch 57 is placed in closed up position for obtaining an indication of $E_o$. If it is no longer equal to the selected operating voltage $E_r$, tap 23 is again adjusted to yield an exciting current through the coil 8 which will restore $E_o$ to the value of $E_r$. If the adjustment of tap 23 has effected the zero subtractive or differential combined voltage of $V_{ns}$ and $V_{ew}$, then the circuits are manipulated and the tap 41 again adjusted until a minimum subtractive voltage $E_d$ is again obtained. Such alternate adjustments of the taps 23 and 41 are repeated until the exciting and sub-excitation currents are such that the voltages $V_{ns}$ and $V_{ew}$ when additively combined yield a voltage $E_o = E_r$, and when subtractively combined yield a voltage $E_d$ which is zero or the least such differential voltage that is obtainable. When this result is obtained for the operating flux $f$, the sub-excitation $i$ and its sense are noted, and then, without moving the instrument with respect to the member, the steps are repeated for an additive voltage $E_o$ equal to $E_F$, the operating voltage corresponding to the other operating flux $F$. The sub-excitation current $I$, at which the new additive voltage of $V_{ns}$ and $V_{ew}$ is $E_F$ and the subtractive voltage is zero or a minimum, is also noted.

I have found experimentally that the algebraic difference between the sub-excitation currents $i$ and $I$ for the two operating voltages $E_r$ and $E_F$, corresponding to operating fluxes $f$ and $F$, is a measure of the stress in the member being tested, in accordance with a calibration curve such as shown in Fig. 6. For ferro-magnetic members of materials of generally similar composition, such as any of the different forms of structural members, a single calibration curve is utilizable with its associated instrument P. The calibration curve is independent of the variations in reluctance and directional properties of such members when it is obtained from a calibrating specimen of the same general class of composition as that of the members to which the instrument is to be applied for ascertaining stress.

The calibration curve of Fig. 6, is specifically for measuring tensile stresses in structural steel members; and applies to a cold-rolled annealed steel instrument of the following characteristics:

Diameter and thickness of body-plate 1, 3 inches and ½-inch, respectively;
Diameters of pick-up pole pieces and exciting pole piece, ½ inch and ¾ inch, respectively;
Length of pole pieces to face of body-plate 1, ¾ inch;
Excitation coil 8, 25 turns of #10 wire;
Pick-up coils 13, 14, 15 and 16, each of 25 turns of #30 wire;
Sub-excitation coils 17 and 18, each of 4 turns of #30 wire; and
Distances between axes of excitation pole piece and pick-up pole pieces, 1 inch.

Such an instrument can be operated with sub-excitation currents in the order of 100 milliamperes and exciting currents of a few amperes, inducing voltages in the order of a small fraction of volt.

The graph of Fig. 6 comprises a common curve portion A—B, and two extending curve-branches B—C and B—D. I am unable to satisfactorily explain the reason for the existence of the two branches; but if the two sub-excitation currents $i$ and $I$ are both negative, then the stress is read from branch A—B; if $i$ and $I$ are both positive, the stress is read from branch B—D; and if $i$ and $I$ are of different sign, then the stress is read from the branches A—B or B—C. The absolute value of the algebraic difference is used in connection with the curve of Fig. 6, that is, the sign of the difference is ignored. Only rarely are the values of $i$ and $I$ such as to lie on the curve-branch B—C.

Calibration of the instrument

As aforementioned, in instrument is calibrated once on a member to which are applied various known stresses. The examples of Figs. 3 or 4 could be such specimens. The instrument is suitably placed on the specimen, with the described axes aligned, and kept in this position for a series of readings. The exciting coil 8 is energized by any initial current producing an additive voltage of $V_{ns}$ plus $V_{ew}$ which is $E_p$ for the stress known to be in the member parallel to the N-S axis at the disposition of the instrument on the specimen. The conductors $e$, $w$ and $n$, $s$ are then connected subtractively, and sub-excitation current passed through the coils 17 and 18. This sub-excitation current is adjusted in amount until the difference between $V_{ns}$ and $V_{ew}$ is a minimum or zero. Actually, the minimum obtainable differential voltage may be not zero, but may be some small value, due, perhaps, to harmonics or phase-angle displacements between exciting and sub-excitation flux. The additive voltage $E_p$ is now measured and noted. This sub-excitation current for the existing stress is noted. The same procedure is carried out at the same stress with different values of exciting current through the coil 8, corresponding respectively to additive voltages $E_p$, $E_q$, $E_r$ . . . and so on, so that a series of points is obtained for the one value of stress; each point being used for a separate curve of sub-excitation current against stress; and each point being representative at such stress value of the sub-excitation current for that value of stress, which is required for a minimum differential voltage $(V_{ns}-V_{ew})$ at the associated operating flux as measured by the additive voltage $$(V_{ns}+V_{ew}) = E_p, E_q, E_r \ldots$$

as the case may be.

With another value of stress in the specimen, the sub-excitation current values for minimum differential voltages are again ascertained, but this time with exciting currents producing the same additive voltages as in the first or original series of tests, and such runs are repeated through the desired range of stresses.

From this data, a series of separate curves are obtained two of which are curve $p$ in Fig. 8 and curve $r$ in Fig. 9; the former curve showing the values of sub-excitation current required to give minimum subtractive voltage with different stresses in the specimen and a certain combined additive voltage $E_p$ always produced; and the latter curve showing the values of sub-excitation current required to give minimum subtractive voltage with these different stresses in the specimen when the combined additive voltage is always $E_r$.

As many curves are obtained as is desired; each associated with a different operating combined additive voltages $E_p$, $E_q$, $E_r$, representing different operating fluxes $p$, $q$, $r$ . . . The curves are all obtained at the same position and location of the instrument with respect to the specimen.

The sub-excitation current against stress curves for the different operating voltages $E_p$, $E_q$, $E_r$ . . . are not the same, and a pair is chosen, in this case, curve $p$ and curve $r$, which has, on the whole, the greatest difference in sub-excitation currents across the range of stresses. Thus, the curves $p$ and $r$ are repeated in Fig. 10, and the differences in their ordinates for each stress are utilized to obtain a curve such as A—B—D of Fig. 6. The combined additive voltages $E_p$ and $E_r$ are the operating voltages, respectively proportional to two operating fluxes, for the instrument having this calibration curve.

It should be pointed out, however, that I have found that the points on the curves $p$, $r$, etc., do not necessarily repeat themselves under the same stress conditions in the specimen, when the instrument is placed in other locations on the specimen, and that a family of curves for each operating voltage $E_p$, $E_q$, $E_r$ . . ., can be thus obtained by varying the instrument location. Figs. 8 and 9 show such families of curves, $p$ and $r$ corresponding to one location of the instrument on the specimen, $p^1$ and $r^1$ to another location, and so on; the curves with corresponding superscripts being associated with a location, different from the others, of the instrument on the specimen.

Generally, the curves of a family for each value of operating voltage and corresponding operating flux, such as shown in Fig. 8, generally correspond in direction; but with some values of operating voltages, some locations produced curves such as $r^4$ and $r^5$, shown in Fig. 9, which deviated considerably in some ranges from other curves of the family for reasons which I have not been able satisfactorily to explain as yet.

I have observed that for all pairs of corresponding curves $p$ and $r$, or $p^1$ and $r^1$, or $p^2$ and $r^2$, etc., derived for a single disposition or location of the instrument on the specimen, the difference in ordinates for a given stress value is the same for practical purposes. Consequently, the curve A—B—D of Fig. 6 will be obtained irrespective of which pair is chosen. However, for the pairs of curves $p^4$ and $r^4$, and $p^5$ and $r^5$, the curve A—B—C results, so that a calibration curve may have two branches.

It should be pointed out that each family of curves has upper and lower limits of sub-excitation current for each stress (represented by $r$ and $r^5$ in Fig. 8, and $p$ and $p^5$ in Fig. 9), between which the other curves of the family lie, for all different locations of the instrument on the specimen.

The different curves in a family, such as $p$, $p^1$, $p^2$, $p^3$ . . ., apparently result from different physical or anisotropic conditions arising from placing the instrument differently on the specimen, for example, variations in the small air gaps between the poles faces and surface of the specimen; and it may be that curves such as $r^4$ and $r^5$ indicate relatively exceptionally large such air-gaps. It is this uncontrolled anisotropic air-gap variation and the variable unknown directional magnetic properties due to the grain-anisotropy of a member in which the stress is to be determined, that makes it desirable to use the difference between two sub-excitation currents obtained from two different operating fluxes for measuring the stress. I have found this difference in such currents to be a function solely of the stress in ferro-magnetic members, and independent of other anisotropic effects.

It is not necessary to have an absolutely clean and smooth surface on the stressed member upon which the pole pieces of the instrument rests, but air-gaps over $\frac{1}{32}''$ should preferably be avoided; by air-gap meaning substances, including air, between the pole pieces and specimen or member, having approximately unity permeability. Ordinary rust, scale or paint layers are usually less than $\frac{1}{32}''$ thick so that the instrument can be placed directly on such a member. If such a layer has a greater thickness, or the layer is very irregular it may be desirable to scrape or sand it down, or otherwise smoothen it.

In general, more turns in the pick-up coils, or fewer turns in the sub-excitation coils, or both, increase the sensitivity of the instrument. The number of turns in the main exciting coil depends on the exciting currents desired; but smaller magnetomotive forces are advisable if the members to be explored are known generally to have low permeabilities.

It would seem that any one curve of Figs. 8 or 9 could be used to ascertain stress, but my present opinion is that anisotropic effects are generally so large that results obtained from such a curve are generally considerably in error and unreliable. By using the procedure I have described dependable results can be obtained within accuracies of 10 percent and better, depending on the calibre of the measuring apparatus and system.

I prefer to use four pick-up coils rather than two angular-displaced pick-up coils, in order to obtain a more reliable measurement of stress in the longitudinal direction of the member below the line joining the centers of the pole pieces 2, 3 and 5.

At any instant, the flux portion in the member from the central pole piece 2 to pick-up pole piece 3 has an opposite sense, or vectorial direction, relative to the flux portion in the member from the central pole piece 2 to the pick-up pole piece 5, on the same axis with the pole piece 3; and the same is true for the flux portions along the transverse axis.

While I have shown in Figs. 6–10 curves for tensile stresses, compressive stress will result in utilizable curves which lend themselves to the procedure described.

While I have described my invention in a form which I now believe to be the best mode of application, it is obvious that my invention opens a field in which further efforts may lead to many refinements or modifications.

I claim as my invention:

1. Means for ascertaining stress in a stressed ferro-magnetic member, comprising magnetomotive force means for establishing two magnetic flux portions in said member, one flux portion being in a portion of said member in which the stress is substantially known, and another flux portion being in another portion of said member in which the stress is to be ascertained, and means for obtaining a response representative of a relationship between said flux portions.

2. Means for ascertaining stress in a loaded ferro-magnetic member, comprising a first means for producing a physical quantity measurably responsive to a magnetic characteristic of the member in a substantially unstressed direction while said member is subjected to a loading producing stress in a different direction therein, and a second means for producing another physical quantity measurably responsive to a similar magnetic characteristic of the member in said stressed direction while said member is loaded as aforesaid.

3. Means for ascertaining stress in a loaded ferro-magnetic member, comprising means for obtaining a manifestation dependent upon a magnetic characteristic of the member in a substantially unstressed direction while said member is subjected to loads producing stress in a different direction therein, means for obtaining a manifestation dependent upon a magnetic characteristic of the member in said stressed direction while said member is loaded as aforesaid, and means for operatively associating, in a predetermined manner, the first said means and second said means for obtaining an indicative response to a combination of the manifestations obtained by the first said means and second said means.

4. A stress-measuring instrument system of a type described, comprising means providing a plurality of permeable magnetic-flux paths, said means having a common portion and a plurality of angularly-related branch portions for said paths, said common portion and said branch portions having faces adapted to be associated with a member in which a stress is to be determined, means for producing an alternating flux in said common portion, coil means associated with each branch portion for obtaining an electrical quantity measurably responsive to the alternating flux therein, and means acting outside said common portion on selected ones only of said branch portions to control the flux through said selected ones of said branch portions.

5. A stress-measuring instrument system of a type described, comprising means providing a plurality of permeable magnetic-flux paths, said means having a common portion and four branch portions for said paths, extending from said common portion in successive substantially ninety degree relation, said common portion and said branch portions having ends adapted to be associated with a member whose stress is to be determined, excitation means including an exciting coil for producing a varying flux in said common portion, said excitation means comprising means for passing an exciting flux-producing current through said exciting coil, means including pick-up coils associated with each branch portion, in which voltage is induced by the portion of said varying flux passing therethrough, and sub-excitation means, including coil means, for producing magnetomotive forces acting on a pair of said branch portions, arranged on opposite sides of said common portion.

6. Means for ascertaining stress in a stressed ferro-magnetic member, comprising magnetomotive force means for providing a first flux portion in said member in a direction primarily along a substantially unstressed portion of said member, and means for providing a second flux portion in said member in a direction primarily along a stressed portion of said member; adjustable means for adjusting the relative magnitude of said flux portions; and indicating means for indicating the extent of such adjustment by said adjustable means.

7. Means for ascertaining stress in a stressed ferro-magnetic member, comprising magnetomotive force means for establishing a flux portion in said member in a direction primarily along an unstressed portion of said member, and a flux portion in a direction primarily along a stressed portion of said member, the first said direction extending angularly from the second said direction, means for obtaining an electrical quantity measurably responsive to the first said flux portion, means for obtaining an electrical quantity measurably responsive to the second said flux portion, and means for selectively additively or subtractively combining said electrical quantities.

8. Means for ascertaining stress in a stressed ferromagnetic member, comprising alternating magnetomotive force means, for providing a first pair of distinct flux portions in said member in a direction primarily along a substantially unstressed portion of said member, and means for providing a second pair of distinct flux portions in said member in a direction along a stressed portion of said member, said flux portions having a common path extending from an intersection of said directions; means for commonly adjusting the sum of said flux portions to any one of a plurality of predetermined values; adjustable means for adjusting the relative magnitudes of the flux portions of one said pairs of flux portions with respect to the other pair, to a predetermined relationship for each of said sums of said flux portions; and indicating means for indicating for each of said sums the extent of the adjustment of said adjustable means.

9. A stress-measuring system of a type described, comprising means for providing a magnetic path having a plurality of magnetically-parallel branches, said branches being adapted to include respectively stressed and unstressed surface portions of a magnetizable member which is subject to loading, magnetomotive force means for producing alternating magnetic flux in each of said branches, means for producing an electrical quantity measurably representative of the flux in each of said branches, and means for combining said electrical quantities in a manner or manners, said magnetomotive force means comprising adjustable means for causing each of a plurality of combinations of said electrical quantities to be respectively at different predetermined values.

10. Means for ascertaining stress in a stressed ferro-magnetic member, comprising magnetomotive force means for providing a flux portion in said member in a direction primarily along a substantially unstressed portion of said member and a flux portion in a direction primarily along a stressed portion of said member, the first said direction extending angularly from the second said direction, means for obtaining an electrical quantity measurably responsive to the first said flux portion, means for obtaining an electrical quantity measurably responsive to the second said flux portion, and means for subtractively combining said electrical quantities, said magnetomotive force means comprising adjustable means for causing the combination of said electrical quantities to have a minimum absolute value.

11. A stress-measuring instrument of the class described, comprising a first pole piece; a second pole piece, spaced from said first pole piece; a third pole piece spaced from said first pole piece; lines joining the axis of the first pole piece with the axes of the second and third pole pieces forming an angle; an exciting coil on said first pole piece; pick-up coils on said second and third pole pieces; magnetically permeable means connecting an end of said first pole piece with an end of each of said second and third pole piece; the other ends of said pole pieces being free; and a sub-excitation coil on said second pole piece.

12. A stress-measuring system of the class described, comprising a central pole piece; a first pair of pick-up pole pieces, one at each side of said central pole piece on a line therewith; another pick-up pole piece at a side of said central pole piece on a line therewith which is angularly related to the first said line; an exciting coil for said central pole piece; means for providing magnetic paths from one end of said central pole piece to an end of each of said pick-up pole pieces; the other ends of said pole pieces being free; and separate coil means for responding respectively to flux in each of said pick-up pole pieces.

13. A stress-measuring system of the class described, comprising a central pole piece; a first pair of pick-up pole pieces, one at each side of said central pole piece on a line therewith; a second pair of pick-up pole pieces, one at each side of said central pole piece on a line therewith which is substantially perpendicular to the first said line; said pole pieces having substantially parallel axes, said pick-up pole pieces being substantially identical and symmetrically spaced about said central pole piece; an exciting coil for said central pole piece; means for providing similar magnetic paths from one end of said central pole piece to an end of each of said pick-up pole pieces; the other ends of said pole pieces being free; separate coil means for responding respectively to the flux in each of said pick-up pole pieces; means for serially connecting the coil means associated with each pole piece of said first pair of pole pieces; means for serially connecting the coil means associated with the each pole piece of said second pair of pole pieces; and sub-excitation coil means for affecting the flux through the pole pieces of one of said pairs of pole pieces.

14. A stress-measuring system of the class described, comprising a central pole piece; a first pair of pick-up pole pieces, one at each side of said central pole piece on a line therewith; a second pair of pick-up pole pieces, one at each side of said central pole piece on a line therewith which is substantially perpendicular to the first said line; said pole pieces having substantially parallel axes, said pick-up pole pieces being substantially identical and symmetrically spaced about said central pole piece; an exciting coil for said central pole piece; means for providing similar magnetic paths from one end of said central pole piece to an end of each of said pick-up pole pieces; the other ends of said pole pieces being free; separate pick-up coil means for responding respectively to the flux in each of said pick-up pole pieces; means for serially connecting the coil means associated with each pole piece of said first pair of pole pieces; means for serially connecting the coil means associated with the each pole piece of said second pair of pole pieces; sub-excitation coil means for affecting the flux through the pole pieces of one of said pairs of pole pieces; means for passing adjustable currents through said exciting coil and said sub-excitation coil means; and means for obtaining a joint indication of a combined response of said separate pick-up coil means.

15. A stress-measuring instrument of the class described, comprising a central pole piece; a first pair of pick-up pole pieces, one on each side of said central pole piece on a line therewith; a second pair of pick-up pole pieces, one on each side of said central pole piece on a line therewith which is substantially perpendicular to the first said line; an exciting coil on said central pole piece; pick-up coils on each of the pole pieces of said pairs of pole pieces, the pick-up coils of each pair being serially connected; and magnetically permeable means joining an end of said central pole piece with an end of each of said pick-up pole pieces, the other ends of said pole pieces being free.

16. A device of the class described comprising, in combination, means for producing a magnetic flux in a plurality of differently stressed portions of a loaded member having magnetic properties which are affected by the load on the member, and means for automatically comparing a magnetic property of a portion of said member in a direction in which the stress is substantially known with a similar magnetic property of another portion of said member in a direction in which the stress is to be ascertained.

17. Means for ascertaining stress in a stressed ferro-magnetic member having a substantially flat surface, comprising means external to said member for establishing a flux in said member, said means comprising a plurality of arms in substantially right-angular relation for causing said flux to pass through said surface and divide into a plurality of distinct flux portions in said member extending from a point of said member, means for controlling the relative amounts of flux in said plurality of arms, and means for responding to the flux in said plurality of arms.

18. The method of ascertaining stress in a stressed ferro-magnetic member, which comprises establishing a total flux, causing a portion of the flux to pass in said member for a distance in a direction in which the stress in the member is substantially known, causing another portion of the flux to pass in said member for a distance, substantially the same as that of the first said distance, in a direction in which the member is stressed, and adjusting the total flux to a predetermined value.

19. The method of electro-magnetically ascertaining stress in a stressed ferro-magnetic member substantially independently of anisotropic effects, which comprises: a first procedure of establishing a first set of magnetic flux portions in said member, which are of opposite senses at each instant in each of two directions at a fixed location with respect to said member, one of said directions being that in which stress occurs, and the other being that in which substantially no stress is present, and utilizing a magnetomotive force to substantially equalize the pairs of flux portions in the said two directions; a second procedure repeating, in effect, at the same location, the said first procedure with another set of magnetic flux portions of different total magnitude than the said first set; and obtaining a measure of the difference between the magnetomotive forces of the said first and second procedures.

20. The method of electromagnetically ascertaining stress in a stressed ferro-magnetic member substantially independently of anisotropic effects, which comprises: subjecting a specimen to different known stresses; at each stress carrying out a first procedure which is characterized by the establishment of a first set of magnetic flux portions in said specimen, which are of opposite senses at each instant, in each of two directions at a fixed location with respect to said specimen, one of said directions being along the direction of stress, and the other direction being substantially along an unstressed direction, and utilizing a magnetomotive force to substantially equalize the pairs of flux portions in the said two directions; carrying out a second procedure repeating, in effect, at the same location, the said first procedure with another set of magnetic flux portions of different total magnitude than the said first set; and noting a measure of the difference between the said magnetomotive forces of the said first and second procedures at each of the said different known stresses.

21. The method of electromagnetically ascertaining stress in a stressed ferro-magnetic member substantially independently of anisotropic effects, which comprises: subjecting a specimen to different known stresses; at each stress carrying out a first procedure which is characterized by the establishment of a first set of magnetic flux portions in said specimen, which are of opposite senses at each instant, in each of two directions at a fixed location with respect to said specimen, one of said directions being along the direction of stress, and the other direction being substantially along an unstressed direction, and utilizing a magnetomotive force to substantially equalize the pairs of flux portions in the said two directions; carrying out a second procedure repeating, in effect, at the same location, the said first procedure with another set of magnetic flux portions of different total magnitude than the said first set; noting a measure of the difference between the said magnetomotive forces of the said first and second procedures at each of the said different known stresses; repeating the said first and second procedures on a member in which a stress is to be determined; obtaining a measure of the difference between the said magnetomotive forces of such repeated procedures; and comparing the said obtained measure with the said noted measures for substantially ascertaining the stress in the last said member.

22. The method of electromagnetically ascertaining stress in a stressed ferro-magnetic member substantially independently of certain anisotropic effects, which comprises establishing a set of magnetic flux portions of opposite senses at each instant extending for substantially the same distance in opposite directions inside said member from substantially a point at a fixed location with respect to said member, and causing each flux portion to pass, in concentrated form, out of said member and into separate magnetic arms, the arms being homologous so as to produce the same effect on said flux portions.

23. The method of electromagnetically ascertaining stress in a stressed ferro-magnetic member substantially independently of air-gap effects, which comprises: establishing similar complete magnetic paths including respectively a stressed portion of the member and an unstressed portion of the member, the said paths extending out of said member; and passing magnetic flux portions through said paths, having certain total flux magnitude; and subsequently passing different magnetic flux portions through said paths, having a different total flux magnitude.

24. Means of a class described for ascertaining the stress in a portion of a magnetic member subjected to loading, comprising means for producing a magnetic flux in said member in opposite aligned directions in which the stress is substantially known and in opposite aligned directions in which the stress is to be ascertained, said means comprising a plurality of substantially unstressed arms associable with said member, through which said fluxes pass, and means associated with said plurality of arms for deriving physical quantities responsive to different fluxes therein.

HUNT DAVIS.